US009636863B2

(12) United States Patent
Geltinger et al.

(10) Patent No.: US 9,636,863 B2
(45) Date of Patent: May 2, 2017

(54) BLOW MOULDING MACHINE WITH CENTERING OF THE BASE OF THE BLOW MOULD

(71) Applicant: KRONES AG, Neutraubling (DE)

(72) Inventors: Florian Geltinger, Donaustauf (DE); Kevin Folger, Alteglofsheim (DE); Thomas Spitzer, Wiesent (DE)

(73) Assignee: Krones, AG, Neutraubling (DE)

( * ) Notice: Subject to any disclaimer, the term of this patent is extended or adjusted under 35 U.S.C. 154(b) by 193 days.

(21) Appl. No.: 14/607,387

(22) Filed: Jan. 28, 2015

(65) Prior Publication Data

US 2015/0224701 A1    Aug. 13, 2015

(30) Foreign Application Priority Data

Feb. 13, 2014   (DE) .................. 10 2014 101 853

(51) Int. Cl.
*B29C 49/48*   (2006.01)
*B29C 49/36*   (2006.01)
(Continued)

(52) U.S. Cl.
CPC .............. *B29C 49/36* (2013.01); *B29C 49/48* (2013.01); *B29C 49/70* (2013.01); *B29D 22/003* (2013.01);
(Continued)

(58) Field of Classification Search
CPC .................... B29C 49/48; B29C 2049/4892
See application file for complete search history.

(56) References Cited

U.S. PATENT DOCUMENTS 5,255,889 A    10/1993  Collette et al.
7,241,130 B2    7/2007   Arakelyan
(Continued)

FOREIGN PATENT DOCUMENTS

DE    2010039803    3/2012
DE    2010048720    4/2012
(Continued)

OTHER PUBLICATIONS

Partial machine translation of FR2720680A1 dated Dec. 1995 obtained from the espace website.*

(Continued)

*Primary Examiner* — Robert B Davis
(74) *Attorney, Agent, or Firm* — Onello & Mello, LLP.

(57) ABSTRACT

An apparatus for shaping plastics material pre-form into plastics material containers, comprises a blow mold device which forms a cavity inside. The plastics material pre-forms are expanded to form the plastics material containers. The blow mold device has a first blow mold part, a second blow mold part, and a base part. A blow mold carrier device holds the blow mold device. The blow mold carrier device has a first carrier part for holding the first blow mold part and a second carrier part for holding the second blow mold part. A third carrier part holds the base part. A centering mechanism centers the base part. The centering mechanism has a first engagement element which is which is movable with respect to a second engagement element. One of the first and second engagement elements is arranged on the third carrier part.

13 Claims, 5 Drawing Sheets

(51) Int. Cl.
B29C 49/70 (2006.01)
B29D 22/00 (2006.01)
B29C 49/06 (2006.01)
B29C 49/46 (2006.01)
B29L 31/00 (2006.01)

(52) U.S. Cl.
CPC ...... *B29C 49/06* (2013.01); *B29C 2049/4697* (2013.01); *B29C 2049/4892* (2013.01); *B29L 2031/712* (2013.01)

(56) References Cited

U.S. PATENT DOCUMENTS

| | | | |
|---|---|---|---|
| 7,563,089 B2 * | 7/2009 | Dannebey | B29C 49/48 249/102 |
| 8,100,688 B2 * | 1/2012 | Litzenberg | B29C 49/56 425/451.4 |
| 8,403,660 B2 | 3/2013 | Stoiber | |
| 8,714,957 B2 | 5/2014 | Blochmann et al. | |
| 8,741,205 B2 | 6/2014 | Geltinger et al. | |
| 2006/0093699 A1 | 5/2006 | Arakelyan | |
| 2009/0028976 A1 | 1/2009 | Dannebey et al. | |
| 2011/0018177 A1 * | 1/2011 | Goss | B29C 33/42 264/531 |
| 2011/0129558 A1 | 6/2011 | Langlois | |
| 2012/0052149 A1 | 3/2012 | Stoiber | |
| 2012/0091631 A1 | 4/2012 | Blochmann et al. | |
| 2012/0306127 A1 * | 12/2012 | Geltinger | B29C 49/48 264/532 |

FOREIGN PATENT DOCUMENTS

| | | | |
|---|---|---|---|
| DE | 2011109976 | 9/2012 | |
| DE | 2011104316 | 12/2012 | |
| FR | 2720680 A1 * | 12/1995 | B29C 33/305 |
| WO | 2004002716 | 1/2004 | |

OTHER PUBLICATIONS

Extended European Search Report dated Jul. 30, 2015, issued in corresponding application No. 15155048.0.
German Search report dated Sep. 18, 2014 issued in corresponding German Application No. 10 2014 101 853.2.

* cited by examiner

BLOW MOULDING MACHINE WITH CENTERING OF THE BASE OF THE BLOW MOULD

FIELD

The present invention relates to an apparatus and a method of shaping plastics material pre-forms into plastics material containers, such as in particular, but not exclusively, plastic bottles.

DESCRIPTION OF DRAWINGS

Further advantages and embodiments are evident from the accompanying drawings. In the drawings

DETAILED DESCRIPTION

Figure 1:
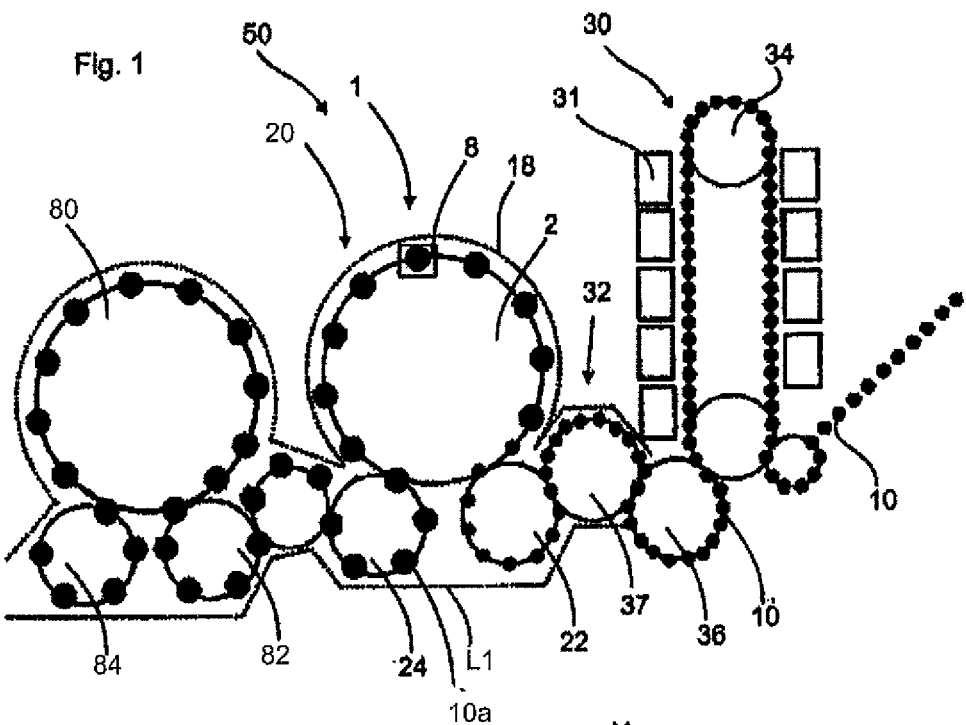
FIG. 1 is an illustration of a plant for the production of plastics material containers.

Apparatus and methods for shaping plastics material pre-forms into plastics material containers have long been known from the prior art. In this case plastics material pre-forms are usually heated and are then introduced into a blow mould. The plastics material pre-forms are shaped in this blow mould to form the plastic bottles by being acted upon with compressed air.

These blow moulds are usually formed in this case from a plurality of component parts, for example from lateral parts and from a base part, which jointly bound the cavity inside which the plastics material pre-forms are shaped. In this case, in order to expand the plastics material pre-forms, a considerable internal pressure in the bottle is usually necessary. During the formation of the plastics material containers very high forces of up to 50 kN, which act upon the base mould and press it away in the axial direction (also referred to below as the longitudinal direction of the plastics material pre-form), also arise on account of this internal pressure in the bottle.

In order to absorb these forces, complementary positively locking centering pieces with a prismatic contour are inserted between the base mould or the base part of the blow mould device respectively and the (moved) lateral parts. The contact face, by way of which the force is transmitted, is thus made oblique (prismatic). As the mould carrier is closed and opened these faces engage one in the other, as a result which the base part is actively pulled upwards as a result of the slope.

As a result of this sliding movement which takes place during the opening and closing of the blow mould, however, microscopic wear occurs. This microscopic wear is prevented by cyclical lubrication. In recent years, however, attempts have also been made to made blow moulding machines of this type hygienic or optionally even sterile.

A possible approach consists in using a self-lubricating plastics material from which the respectively complementary components are produced. In addition, however, as a result of this, wear which occurs may not be completely eliminated. Furthermore, a not inconsiderable contact noise arises from the aforesaid contact between the oblique faces.

In addition, the correctly fitting production of the faces which are oblique in each case, in particular in the rounding, is complicated and expensive.

The object of the present invention is therefore to reduce the susceptibility of machines of this type to wear. In addition, the production outlay for machines of this type should also be reduced. These objects are attained according to the invention by the subjects of the independent claims. Advantageous embodiments and further developments form the subject matter of the sub-claims. An apparatus according to the invention for the shaping of plastics material pre-forms into plastics material containers has a blow mould device which forms a cavity inside which the plastics material pre-forms are capable of being expanded to form the plastics material containers, and in particular plastic bottles. In this case the blow mould device has a first blow mould part (and in particular a first lateral part) and a second blow mould part (in particular a second lateral part) as well as a base part, which are movable with respect to one another in order to open or to close the blow mould device. Furthermore, a blow mould carrier device for holding the blow mould device is provided, the blow mould carrier device having a first carrier part for holding the first blow mould part and a second carrier part for holding the second blow mould part. Furthermore, the apparatus has a third carrier part for holding the base part and, in addition, the apparatus has a centering mechanism in order to center the base part at least with respect to the blow mould parts.

In this case this centering mechanism has a first engagement element which is designed in the form of a projection and which is movable with respect to a second engagement element designed in the form of a recess, one of these engagement elements being arranged on the third carrier part and, furthermore, the recess and the projection being designed in such a way that during a feed movement the projection can engage in the recess. Furthermore, the engagement elements are in contact by way of a contact face at least for a time in such a way that the base part is supported by this contact in a longitudinal direction of the plastics material pre-forms.

According to the invention the engagement elements are arranged in such a way that they are not capable of being brought into contact with each other or do not come into contact with each other respectively along the contact face at least for a time during a closing movement of the blow mould device.

Whereas it is proposed in the prior art that the base part should also be forced in the direction of the two other blow moulding parts by the aforesaid oblique faces just in a feed movement of the lateral parts of the blow mould, in contrast it is now proposed that, in particular, a contact of this type between oblique faces should not take place even during the opening and closing movements. In this way, the wear mentioned above is reduced.

In the case of a preferred embodiment the recess is formed in the carrier of the base part and the projection, on the other hand, engages in this recess. Conversely, however, it would also be possible for the projection to be formed on the base part and for the recess to be the corresponding complementary engagement element. Although a recess is preferably understood as being a recess which surrounds the projection in at least three directions at right angles to one another or at an angle different from 0°, the recess can also be a step-like structure, in which case the projection is supported for example on a stepped portion of this recess.

In the case of a further advantageous embodiment the apparatus also has a stretch rod which is capable of being inserted into the plastics material pre-forms. This stretch rod is used, in particular, for stretching the plastics material pre-form in the longitudinal direction thereof in this case.

In the case of a further advantageous embodiment the apparatus also has a stressing device which is used to act upon the plastics material pre-form during the expansion procedure with a gaseous medium, and in particular with blow moulding air.

In the case of a further advantageous embodiment the apparatus also has a feed device which feeds the base part to the two blow mould parts.

Furthermore, a movement device is also provided which feeds the engagement elements towards each other, and in particular inserts the projections into the recess. In this case it is possible for these engagement elements to be arranged on the lateral parts of the blow mould carrier and to be moved with the latter. It would also be possible, however, for the aforesaid engagement elements to be movable with respect to the blow mould carrier parts and, in this way, also to be capable of carrying out an active feed of the base part to the lateral parts of the blow mould device. As mentioned above, it is preferable for the engagement element also to serve as a centering element. For this purpose two engagement elements are preferably provided, which are brought up to the recess or the carrier respectively of the base part from two different sides, in particular from two opposite sides. It is advantageous for the projection to be designed in such a way that it has a pre-set clearance with respect to the recess. This means that it is preferable for the projection to be able to move inside the recess by a certain degree, in particular in the longitudinal direction of the plastics material pre-forms.

It is advantageous for the engagement elements to be arranged and/or designed in such a way that during the entire closing movement and preferably also during the opening movement no contact takes place between the engagement elements, and in particular no contact along the aforesaid first contact face. With respect to the method, a feed of the two engagement elements to each other (in particular in order to form a contact face) takes place only after the closing procedure has taken place.

In contrast to the prior art the base part or the base mould respectively is no longer raised by way of the conical centerings attached, in particular, to the mould halves or to the lateral parts respectively, but it is positioned higher by a further drive means, such as for example rollers or a cam. As a result of the active higher positioning of the base part, no contact preferably takes place between these components in the opening and closing movement. In this case the distance between these two components during the opening and/or closing movement is preferably between 0.01 mm and 1 mm, preferably between 0.02 mm and 0.8 mm, preferably between 0.05 mm and 0.5 mm, and in a particularly preferred manner approximately 0.1 mm. This distance has been found to be particularly advantageous in order to prevent contact in a reliable manner in working operation on the one hand and in order not to allow an excessive clearance, however, between the base part and the engagement elements on the other hand.

In this case the faces co-operating with each other can be made horizontal or plane respectively. After the mould carrier or the blow mould carrier device respectively is opened or closed respectively, the base part or the base centering is preferably applied again. In this way, the gap between the engagement elements is closed.

If the apparatus has a central base cam, this cannot constitute a problem since the base cam is then no longer in engagement with feed elements of this type. As a result of the coupling of a base actuation with the movement of the mould carrier it is preferably possible for the aforesaid lower cam roller to be mounted in a movable manner in order to be able to give way even in the event of a blow moulding pressure occurring.

It is preferable for the engagement elements to move with respect to each other, in particular in a longitudinal direction of the plastics material containers, at least for a time in the period of time between the complete closing of the blow mould device and the start of the opening movement of the blow mould device.

It is therefore preferable for the centering device also to absorb the forces arising from the internal pressure in the container and to divert them, in particular, to further elements, such as for example the mould shells, the mould carrier shells, the mould carrier or other components fastened to the mould carrier halves. In addition, however, as mentioned above, this base centering is positioned during the closing movement of the blow mould carrier parts or the blow mould devices respectively in such a way that, in particular, it has no contact with the components named above or the matching elements there until the end of the closing movement or at the start of the opening movement respectively.

In other words it is preferable for a mould gap between the engagement elements to be larger during the closing movement than during the blow moulding procedure.

In the case of a further advantageous embodiment the shaping device is arranged on a movable carrier, and in particular on a rotatable carrier or a blow moulding wheel respectively.

It is advantageous for the apparatus also to have a clean room, inside which the plastics material pre-forms are expanded to form the plastics material containers. The present invention is suitable, in particular, for clean room applications of this type, since it dispenses with lubricants, which in general pose a risk for a clean room or for keeping a clean room sterile respectively. It is advantageous for a plurality of the aforesaid shaping devices to be arranged on the aforesaid rotatable carrier.

In the case of a further advantageous embodiment this clean room has a plurality of walls which bound the clean room. It is advantageous in this case for at least two of these walls to be made movable with respect to each other. It is preferable for one of the walls to be made rotatably movable with respect to the other wall, namely in particular rotatably movable with respect to an axis of rotation of the blow moulding wheel.

In the case of a further advantageous embodiment a sealing device is also provided, which seals the clean room or sterile room respectively off from a (non-sterile) environment.

In the case of a further advantageous embodiment this sealing device is a gas seal and/or a so-called surge chamber.

In the case of a further advantageous embodiment the base part is arranged closer to the lateral parts (i.e. the first and second blow mould device) at least for a time during the closing movement of the blow mould device than during the actual shaping procedure. This means that first the blow mould is closed and then the base part of the blow mould is pressed against the centering or the projection thereof respectively. In general, the base part is therefore preferably situated higher during an opening and/or closing procedure than during the shaping procedure.

It is advantageous for the base part to be situated closer to the lateral parts or the blow mould parts respectively during the entire closing movement than during the shaping procedure. It is advantageous, as mentioned, for the base part to be removed (slightly) from the lateral parts only after the closing procedure.

It is advantageous for a distance between the base part of the blow mould device and the lateral parts or the blow mould parts mentioned above respectively—in particular even during the blow moulding procedure—to be between 0.01 mm and 1 mm, preferably between 0.02 mm and 0.8 mm, preferably between 0.05 mm and 0.5 mm, and in a particularly preferred manner approximately 0.1 mm. In this way, it is preferable for a mould gap between the lateral parts and the base parts to be smaller at least for a time during the closing movement than during the blow moulding procedure.

In the case of a further advantageous embodiment the apparatus has a drive device in order to move one engagement element with respect to the other engagement element in the longitudinal direction of the plastics material pre-forms. It is preferable, as mentioned above, for this to be a drive device which moves the base part—in particular in a longitudinal direction of the plastics material pre-forms.

In the case of a further advantageous embodiment this drive device has a guide cam which is arranged so as to be stationary. It would also be possible, however, for electrical, magnetic, hydraulic or pneumatic drives to be used.

In the case of a further advantageous embodiment, in a closed state of the blow mould device a contact face or a mould gap respectively extends between the engagement elements in a substantially horizontal direction. This means that the aforesaid contact face preferably extends in a horizontal plane. In this way, the mould gap can be kept very small since it is not influenced by the opening movement or closing movement respectively itself. In this case "substantially horizontal" is understood as being that a plane of this contact face deviates from a horizontal plane by less than 10°, preferably by less than 5°, and in a particularly preferred manner by less than 3°, preferably by less than 2°, preferably by less than 1°. It is advantageous for a precisely horizontal orientation to be present.

In this way, the base centering and the matching part thereof are preferably designed in such a way that the contour which absorbs the force is made substantially horizontal.

It is preferable for an engagement area of the engagement elements to extend along a peripheral angle—which is less than 150°—with respect to a longitudinal direction of the plastics material pre-forms. It is preferable for this peripheral angle to be less than 120°, and in a particularly preferred manner less than 100°. In other words a covering angle, in the region of which the base centering is in contact with the respective matching parts, has an angle of less than 150°.

In the case of a further advantageous embodiment the complementary cross-sectional contours of the engagement elements, i.e. of the base centering and the matching part, are designed in such a way that those regions which are facing the surface absorbing the force are at a distance from the respective complementary matching parts when the internal pressure in the container is applied. This means, as mentioned above, that the cross-sectional contours have clearance with respect to each other.

In the case of a further advantageous embodiment the drive which moves or actuates respectively the base part, or actively lowers the base part respectively, in order to achieve an abutment of the engagement elements against each other, is active at the latest at the moment at which an internal pressure in the container starts to act upon the base part. It is advantageous for the aforesaid drive, which moves or actuates respectively the base part, or raises the base mould respectively, no longer to be active at the latest from the moment before the blow mould carrier parts start to open. It is advantageous for a drive device for moving the base mould during the blow moulding procedure or while an internal pressure in a bottle is applied respectively not to be coupled to the carrier of the base part or to the base part respectively.

In the case of a further advantageous embodiment it is also possible for the drive device to hold the base part in a raised position while the internal pressure in the container is applied to the base part of the blow mould device. In this case, however, elements are preferably provided which rest in the load chain between the base part and the drive device, which are deformed in a defined manner as a result of the action of force by the internal pressure in the container and, in this way, allow the base part to rest against the respective engagement elements or the matching parts of the force transmission means respectively.

It is advantageous for a mould gap, which extends transversely to the longitudinal direction of the plastics material pre-forms, to be present between at least one lateral part and the base part during the shaping procedure.

The present invention further relates to a method of shaping plastics material pre-forms into plastics material containers, and in particular into plastic bottles. In this case the plastics material pre-forms are introduced into a blow mould device and in this blow mould device they are shaped into the plastics material containers by being acted upon with a flowable, and in particular a gaseous, medium. The blow mould device has in this case at least one first blow mould part and one second blow mould part, in particular two lateral parts, and a base part, which jointly form a cavity inside which the plastics material pre-forms are formed into the plastics material containers.

In addition, the blow mould parts arranged on the carrier parts are advanced one after the other for a closing procedure of the blow mould device, in which case the base part is further centered with respect to the blow mould parts and for this centering procedure a first engagement element designed in the form of a projection is moved with respect to a second engagement element designed in the form of a recess and one of these engagement elements is arranged on a third carrier part which is used for holding the base part. In addition, the recess and the projection are designed in such a way that the projection engages in the recess during a feed movement, the engagement elements being in contact by way of a first contact face at least for a time during a shaping procedure and the base part being supported by this contact in a longitudinal direction of the plastics material pre-forms.

According to the invention the aforesaid engagement elements are not in contact with each other along the contact face at least for a time during a closing movement of the blow mould device and/or an opening movement of the blow mould device. It is advantageous for the engagement elements not to come into contact with each other along the contact face during this closing movement or in all events until the end of the closing movement respectively.

It is advantageous for the engagement elements not to come into contact with each other at least for a time during a closing movement of the blow mould device and/or an opening movement of the blow mould device.

It is therefore also proposed in terms of the method that during the closing movement, and preferably also during the opening movement, a contacting of the engagement elements and a wearing resulting therefrom are prevented.

In the case of a further advantageous embodiment a distance between the base parts and the lateral parts is increased at least for a time after the start of the closing procedure of the blow mould device and before the start of an opening procedure of the blow mould device. This means that this distance is greater at least for a time during the aforesaid shaping procedure than during an opening procedure and/or during a closing procedure. In this way, as mentioned above, a mould gap between the base part and the blow mould parts or lateral parts respectively is formed or enlarged respectively during the blow moulding procedure.

In the case of a further advantageous embodiment the engagement elements are moved with respect to each other in a longitudinal direction of the plastics material pre-form to be expanded after the start of a closing procedure of the blow mould device and before the start of an opening procedure of the blow mould device.

FIG. 1 is a diagrammatic illustration of a plant for the production of plastics material containers. This plant 50 has a heating device 30 in which plastics material pre-forms 10 are heated. In this case these plastics material pre-forms 10 are conveyed through this heating device 30 by means of a conveying device 34, such as in this case a circulating chain, and are heated by a plurality of heating elements 31 in this case. This heating device 30 is followed by a transfer unit 36 which transfers the pre-forms 10 to a sterilization device 32. This sterilization device 32 likewise has in this case a conveying wheel 37 and sterilization elements can be arranged on this conveying wheel 37 or even in a stationary manner. Sterilization by hydrogen peroxide gas or even by electromagnetic radiation for example is possible in this region. In particular, an internal sterilization of the pre-forms is carried out in this region.

The reference number 20 designates a clean room in its entirety, the external boundaries of which are indicated in this case by the dotted line L1. In a further preferred embodiment the clean room 20 is not only arranged in the region of the conveying wheel 2 and the filling device 80, but if possible already starts in the region of the heating device 30, the sterilization device 32, the plastics material pre-form supply and/or the plastics material pre-forms production. It will be noted that this clean room 20 starts in the region of the sterilization device 32. Sluice devices can be provided in this region, in order to introduce the plastics material pre-forms into the clean room 20, without too much gas flowing inside the clean room in this case and thus being lost.

As indicated by the broken line L, the clean room is adapted to the external shape of the individual components of the plant. In this way, the volume of the clean room can be reduced.

The reference number 1 designates in its entirety a shaping device in which a plurality of blow moulding stations or shaping stations 8 respectively are arranged on a conveying wheel 2, only one of these blow moulding stations 8 being illustrated in this case. The plastics material pre-forms 10 are expanded into containers 10a by these blow moulding stations 8. Although it is not shown in detail here, the entire region of the conveying device 2 is not present inside the clean room 20, but the clean room 20 or isolator respectively is implemented in the form of a mini-isolator as it were inside the apparatus as a whole. In this way, it would be possible for the clean room to be designed in the manner of a channel, at least in the region of the shaping device 1.

The reference number 22 refers to a supply device which transfers the pre-forms to the shaping device 1, and the reference number 24 refers to a removal device which removes the produced plastics material containers 10a from the shaping device 1. It will be noted that in the region of the supply device 22 and the removal device 24 the clean room 20 has recesses in each case which receive these devices 22, 24. In this way, a transfer of the plastics material pre-forms 10 to the shaping device 1 and a taking-on of the plastics material containers 10a from the shaping device 1 respectively can be achieved in a particularly advantageous manner.

The expanded plastics material containers are transferred to a filling device 80 by a transfer unit 82 and they are then removed from this filling device 80 by way of a further conveying unit 44. In this case the filling device 80 is also situated inside the aforesaid clean room 20. In addition, in the case of the filling device 80 it would be possible not for the entire filling device 80 with a reservoir for a beverage for example to be arranged completely inside the clean room 20, but also in this case only those regions in which the containers are in fact conveyed. In this respect the filling device could also be designed in a similar manner to the apparatus 1 for the shaping of plastics material pre-forms 10.

As mentioned, in the region of the apparatus 1 the clean room 20 is reduced to as small as possible an area, namely essentially to the blow moulding stations 8 themselves. As a result of this compact design of the clean room 20 it is possible in an easier and more rapid manner to produce a clean room in any case and, in addition, keeping the system sterile in the operating phase is less complicated. In addition, less sterile air is required, and this leads to smaller filter plants and also the risk of uncontrolled swirl formation is reduced.

Figure 2:
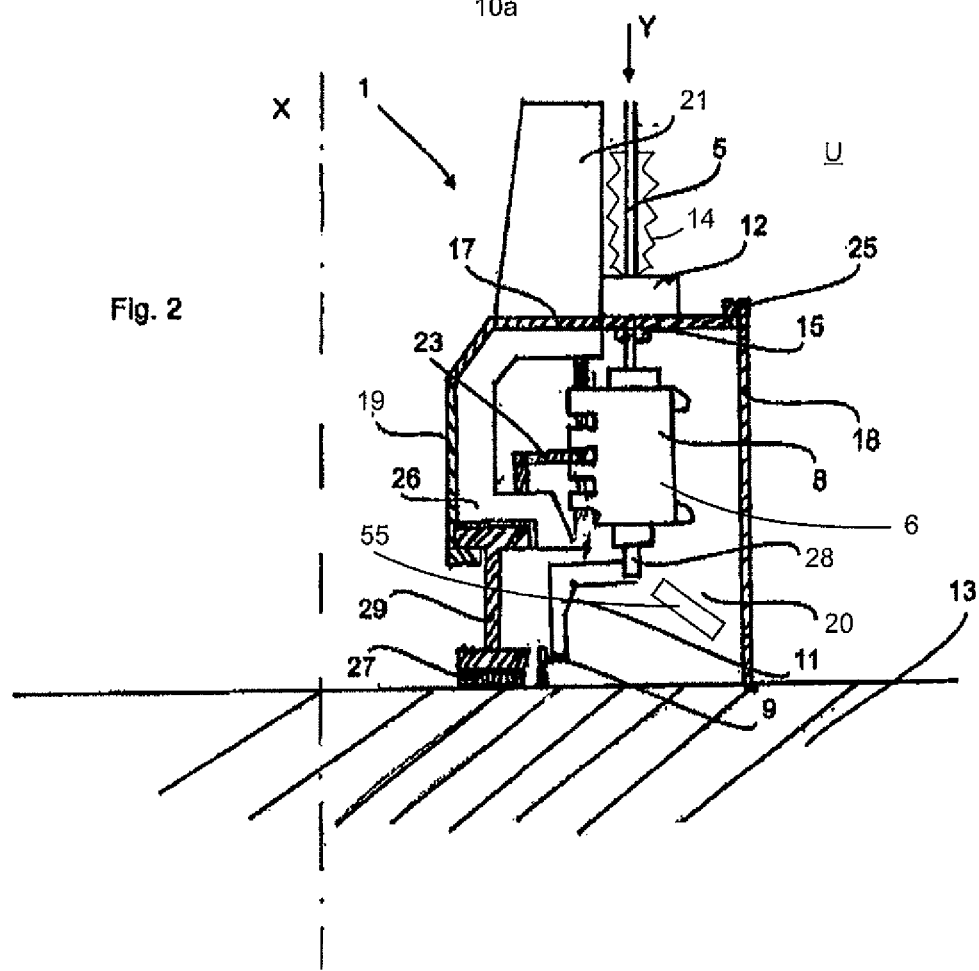
FIG. 2 is an illustration of a shaping station inside a clean room.

FIG. 2 is a detailed illustration of the apparatus 1 in the region of a blow moulding station 8. A plurality of blow moulding stations 8 of this type are moved in a rotating manner about an axis X by a conveying device 2 or a carrier respectively. The blow moulding station 8 is, as will be noted from FIG. 2, guided inside the clean room 20, in this case designed in the manner of a channel. This clean room 20 is closed off by a movable lateral wall 19 and a cover 17 formed in one piece with this lateral wall 19. This lateral wall 19 and the cover 17 rotate in this case with the blow moulding station 8.

The reference number 18 refers to a further wall which bounds the clean room 20. This wall 18 is a wall which is situated on the outside and which is arranged in a stationary manner. A sealing device 25 is provided between the cover 17 and the wall 18, and seals off from each other the elements 17 and 18 movable towards each other, for example, as mentioned above, with the use of a surge chamber. The lower region of the wall 18 is arranged on a base 13 in a fixed and sealed manner. A carrier 26, which likewise moves in a rotating manner and on which in turn a holding device 23 is provided which holds the blow moulding station 8, is provided inside the clean room 20 and in this case resting directly against the wall 19.

The reference number 11 refers to a follower device which can be actuated by a guide cam 9 in order to open and to close the blow moulding station on its path through the clean room 20, in order, in particular, to introduce the plastics material pre-form into the blow moulding station and also in order to remove it again. In this case a guide cam 9 is also arranged inside the clean room 20. It would also be possible for example to remove a portion 11 below the individual blow moulding stations 8 out of the clean room 20.

The conveying device 2 can have still further elements which are arranged above the clean room 20.

The carrier 26 is arranged in a fixed manner in this case on a holding body 29 and this holding body in turn is movable with respect to the base 13. In this case the reference number 27 refers to a further sealing device which in this region too effects a sealing of the areas 13 and 29 movable with respect to each other.

The reference number 5 refers to a stretch rod which is movable with respect to the blow moulding station in order to stretch the plastics material pre-forms 10 in the longitudinal direction thereof. In this case a slide 12, with respect to which the stretch rod is movable in the direction Y, is arranged on the cover 17 here. The reference number 21 refers to a further holding means for this slide 12 of the stretch rod 5.

It will be noted that specific areas of the stretch rod are both outside the clean room 20 and inside the clean room 20 during the blow moulding procedure. For this purpose it is possible for a protection device such as a folding bellows which surrounds the stretch rod 5 to be provided outside the clean room 20 or above the slide 12 respectively, so that no region of the stretch rod 5 comes directly into contact with the external environment. The reference letter U designates the (non-sterile) environment of the clean room 20. The reference number 28 designates a carrier for carrying a base mould, which likewise forms a component part of the blow mould 4. This carrier is likewise movable in the direction Y in this case.

The reference number 55 refers to a sterilization device which in this case is preferably arranged in the interior of the clean room 20 and is used for the sterilization of the individual shaping stations or component parts respectively of these shaping stations 8. This sterilization device 55 can act upon the shaping stations 8 in this case with hydrogen peroxide or another sterilization agent for example. In this case the sterilization device 55 can be arranged so as to be stationary and the shaping stations can move with respect to this sterilization device 55. This sterilization device or stressing device 55 respectively can be provided on the conveying wheel 2 or on the stationary wall 18 or can be arranged in a stationary manner in general and can comprise nozzles or the like. In addition, it is advantageous for sterile air for the sterilization of the clean room 20 to be introduced into the clean room 20 by way of the aeration system.

The blow moulds or blow mould devices respectively (not shown) are arranged inside the blow mould carrier 6. More precisely, two blow mould carrier parts can be provided in this case which are pivotable with respect to each other and which hold a blow mould part in each case. As a result of this pivoting procedure, the blow moulds can be opened for the introduction of plastics material pre-forms and for the removal of finished blow moulded containers. These blow mould carriers and blow moulds are likewise arranged in this case inside the clean room.

It would also be possible and preferable (other than as shown in FIG. 2) for the conveying device 2 or the carrier respectively to have a C-shaped external periphery which also forms in part the outer walls of the clean room. In this way, this C-shaped wall of the clean room rotates in this case with the conveying device 2, i.e. the blow moulding wheel. In the case of this embodiment the lower boundary of the clean room is arranged at a distance from the base 13 and moves relative to the base. In this way, the clean room can be made still smaller than as shown in FIG. 2. This C-shaped profile of the conveying device, which in this case forms both an inner wall and a lower and upper covering of the clean room, is preferably sealed off only with respect to the outer wall of the clean room in this case. This outer wall is advantageously arranged in a stationary manner in this case.

The reference number 14 designates in a roughly diagrammatic manner a stressing device which acts upon the plastics material pre-forms with the blow moulding air. In this case this stressing device can have a blow moulding nozzle which is capable of being applied to an aperture edge of the plastics material pre-forms and, in this way, also allows the latter to be acted upon with blow moulding air in a sealed manner. The reference number 15 designates in a roughly diagrammatic manner a valve block which has a plurality of valve devices (not shown in FIG. 2) in order to control the supply of the blow moulding air to the plastics material pre-forms. These valves devices are preferably designed in the above manner in this case. The valve devices described here are preferably also, however, a component part of the stressing device.

Figure 3A:
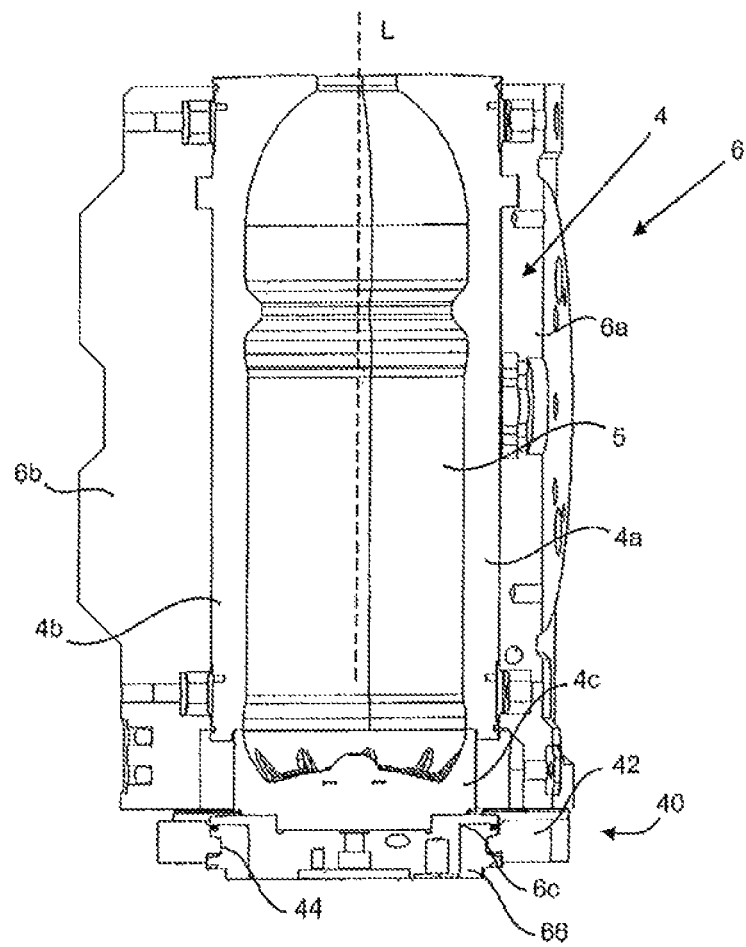
FIGS. 3a, 3b are two illustrations of blow mould devices according to the prior art.
Figure 3B:
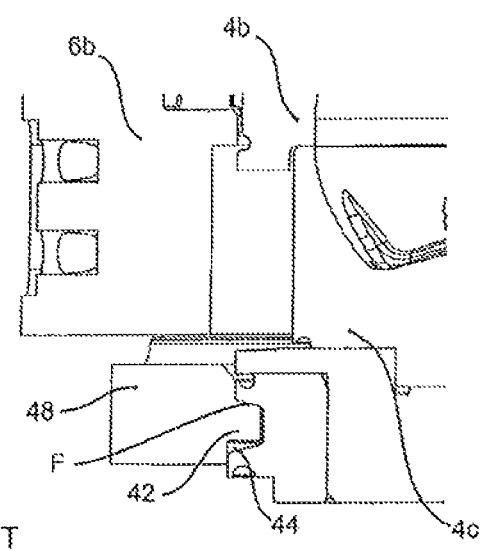

FIGS. 3a and 3b show a blow mould arrangement according to the prior art. In this case the reference number 4 refers to a blow mould device in its entirety. This blow mould device has in this case two blow mould parts or lateral parts 4a and 4b respectively. In addition, the blow mould device has a base part 4c. These lateral parts and the base part together form the cavity 7, inside which the plastics material pre-forms are expanded by being acted upon with compressed air to form the plastics material containers, in particular against an inner wall of the individual blow mould parts. The reference letter L designates a longitudinal direction of the plastics material pre-forms (not shown) to be expanded. At the same time, however, the reference letter L also designates a longitudinal direction of the blow mould device.

The reference number 6 designates a carrier device which is used for holding the blow mould device. This carrier device in turn has in this case two carrier parts 6a, 6b on which the two blow mould parts 4a and 4b are arranged in a detachable manner. These two carrier parts 6a, 6b can be pivoted, namely—in particular—with respect to a pivot axis which extends parallel to the longitudinal direction L, in order to open and close the blow mould device 4. It is advantageous in operation for this to be a pivot axis arranged vertically. In addition, the axis of rotation of the conveying wheel or blow moulding wheel respectively, on which the individual shaping stations are arranged, is preferably arranged parallel to this longitudinal direction.

The reference 6c designates a carrier part which is used for holding the base part 4c.

The reference number 40 designates in its entirety a centering mechanism which is used for centering the carrier part 6c, and thus also the base part 4c arranged on it, with respect to the lateral parts 4a and 4b of the blow mould device.

For this purpose engagement means, which act as suitably adapted engagement means of the base part 4c, are provided on both the right-hand side and the left-hand side of the carrier part 6c. In detail, projections 42 of the feed bodies designated 48 in their entirety engage in this case in recesses 44 which are arranged on the base carrier part 6c. In this way, the carrier part 6c and thus also the base part 4c are supported downwards in the figure in order to withstand the high pressures during the blow moulding procedure.

FIG. 3b is a detailed illustration of the illustration of FIG. 3a. In particular, the design of the projection 42 as well as of the recess 44 will be noted in this case. It is evident that a contact face F, which in this case extends obliquely, is formed between the projection 42 and the recess 44. As the matching part 48 is advanced towards the carrier part 6c or a base centering ring 66 which is arranged on this part, the base mould can be forced upwards by this oblique course. On the other hand, however, the occurrences of wear of the projection and the recess respectively are also present on account of this design. Lubricants are therefore necessary at these points in the prior art, but they are troublesome, in particular, in sterile applications.

Figure 4A:
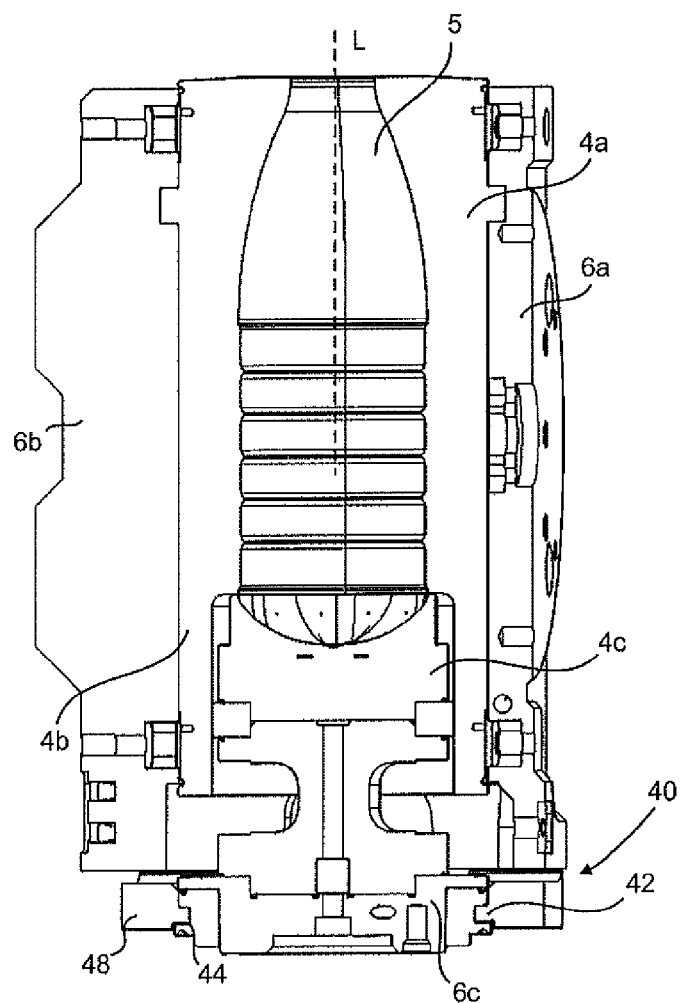
FIGS. 4a, 4b are two illustrations to explain blow mould devices according to the invention.
Figure 4B:
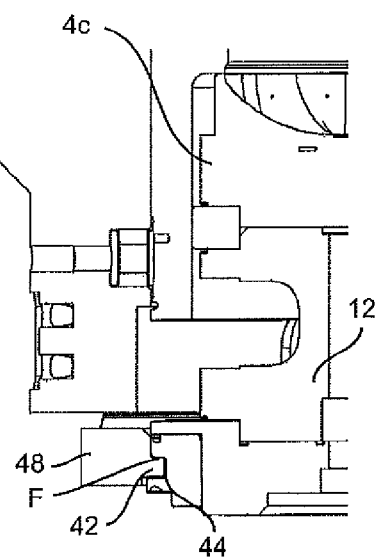

FIGS. 4a and 4b show a blow mould device according to the invention. This corresponds in part to the apparatus already shown in FIGS. 3a and 3b, so that only the differences are dealt with below. These can best be explained with reference to FIG. 4b. Whereas the contact face F extends obliquely in the illustration given in FIG. 3d, it will be noted from the illustration given in FIG. 4b that this contact face extends precisely horizontally or precisely vertically respectively to the longitudinal direction L mentioned above. In this way, it is possible to introduce the projection 42 into the recess 44 during the closing procedure, in such a way that at least no contact occurs along the contact face between the projection 42 and the recess 44. It is preferable, however, for the projection 42 to be designed with respect to the recess 44 in such a way that no contact occurs between the projection 42 and the recess 44 during a closing movement and preferably also not during an opening movement of the blow mould device 4. In this way, any wear can be prevented during the closing procedure and also during the opening procedure respectively.

It will be noted that the recess 44 is formed not directly on the base carrier part 6c, but on a centering ring 66 which is arranged in turn on the base carrier part 6c in a fixed manner. In the state shown in FIG. 4b the situation is shown in which for example a blow moulding procedure can take place. The contact face F is formed here since the base part 4c exerts a force downwards, in particular by the blow moulding pressure present in the interior of the cavity or the plastics material pre-form respectively.

In the situation shown in FIG. 4b no contact occurs between the surface 42c of the projection, which is opposite the surface 42a, and the surface 44c of the recess, which is likewise opposite the surface 44a. It is preferable for these two surfaces never to come into contact with each other.

FIGS. 5a to 5d show a sequence during the expansion of plastics material pre-forms. In the case of the starting situation shown in FIG. 5a the base part 4c is advanced in the direction of the lateral parts. In this case the projections 42 do not yet engage in the recesses 44. A corresponding mould carrier is still opened in this situation in the same way as the two lateral parts 4a and 4b of the blow mould device. In this situation a mould gap S, which in this case has a width in the region of 0.1 mm, is formed between the lateral parts 4a and 4b as well as the base part 4c.

A corresponding mould gap would also occur in this case between a surface 42a of the projection and a surface 44a of the recess corresponding to it if no further vertical adjustment of the base part were carried out.

Figure 5A:
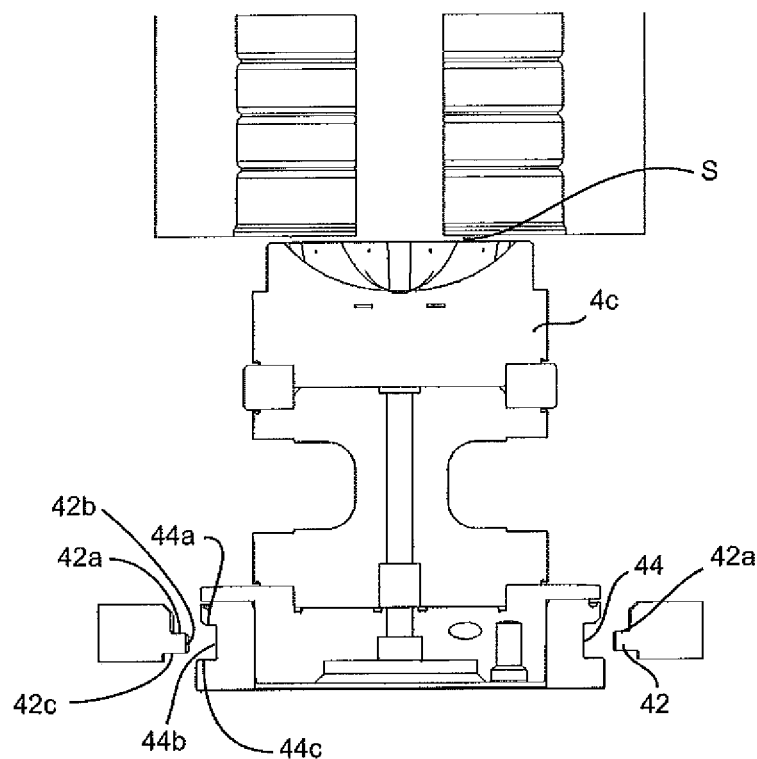
FIGS. 5a-5d are four illustrations to explain a closing process of a blow mould device.
Figure 5B:
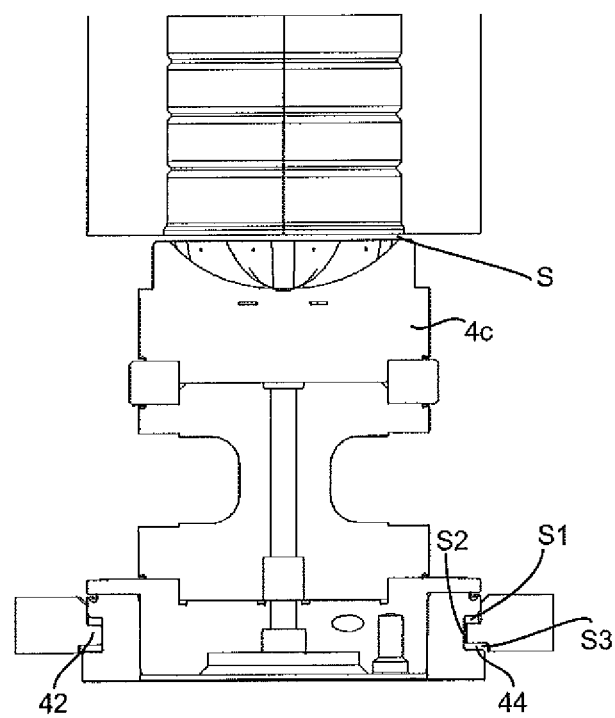

In the case of the situation shown in FIG. 5b the blow mould has been closed, which is evident from the two lateral parts 4a and 4b. At the same time the two projections 42 move into the respective recesses 44. Since the blow moulding procedure has not yet started in this situation, a mould gap S with a width of 0.1 mm is present as before. A corresponding gap S1 of approximately 0.1 mm is also present in this case between the faces 42a and 44a of the projection 42 and the recess 44 named above. It is pointed out once again that the recess completely surrounds the projection 42 in this case, but this would not be absolutely necessary, but rather the recess could also be designed in the form of a step. What is crucial, however, is the respective face 44a or 42a which is subsequently used for supporting the base part 4c.

The reference S2 refers to a gap which is present between the surface 42b of the projection and the surface 44b of the recess. It is preferable for the recess 44 and the projection 42 to be designed in such a way that at no time is there contact between these faces 42b and 44b.

The reference S3 refers to a gap which is present between the surface 42c of the projection and the surface 44c of the recess. It is preferable for the recess 44 and the projection 42 to be designed in such a way that at no time is there contact between these faces 42c and 44c.

Figure 5C:
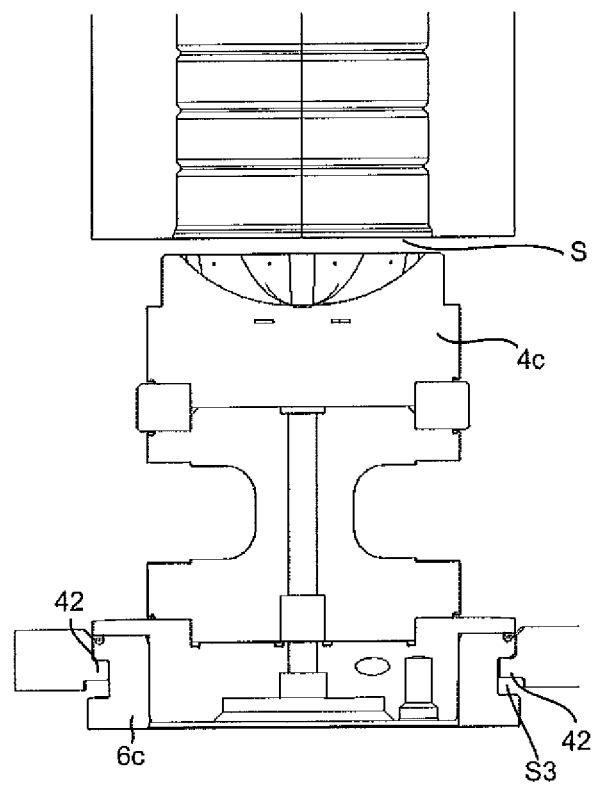

In the case of the design shown in FIG. 5c a blow moulding procedure is just being carried out. On account of the blow moulding pressure the base part 4c is acted upon with a force and moves slightly downwards. In this way, the mould gap S is enlarged to a width of approximately 0.2 mm and on the other hand the gap S1 between the recess or the surface 44a thereof respectively and the projection 42 or the surface 42a thereof respectively is closed. The base part is now supported in this way at the bottom and cannot be removed further from the blow mould parts 4a, 4b.

Figure 5D:
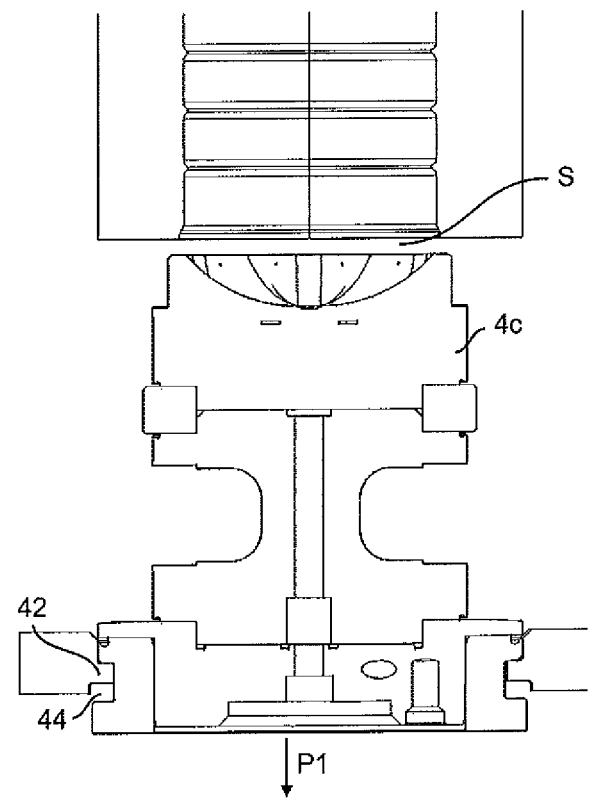

FIG. 5d shows this state in which a blow moulding force which presses the base part 4c downwards as indicated by the arrow P, now acts upon the base part 4c as a result of the blow moulding procedure.

After the end of the blow moulding procedure (not shown) the base part 4c is preferably raised upwards slightly again so that the mould gap S is reduced to 0.1 mm again and on the other hand a mould gap is formed again between the surface 42a and the surface 44a. In this way, contact no longer occurs in this situation between the projection 42 and the recess 44. The blow mould device can now be opened without friction between the projection 42 and the recess 44.

In this way, it is also possible to dispense with the lubrication which is necessary in the prior art.

The Applicants reserve the right to claim all the features disclosed in the application documents as being essential to the invention, insofar as they are novel either individually or in combination as compared with the prior art.

What is claimed is:

1. An apparatus for shaping plastics material pre-forms into plastics material containers, comprising:
   a blow mould device which forms a cavity inside, the plastics material pre-forms capable of being expanded to form the plastics material containers, wherein the blow mould device has a first blow mould part, a second blow mould part, and a base part, which are movable relative to one another in order to open or to close the blow mould device;
   a blow mould carrier device for holding the blow mould device, wherein the blow mould carrier device has a first carrier part for holding the first blow mould part and a second carrier part for holding the second blow mould part, wherein the apparatus has a third carrier part for holding the base part, and wherein the apparatus has a centering mechanism in order to center the base part at least for a time with respect to the first and second blow mould parts, wherein the centering mechanism has a first engagement element which is designed in the form of a projection and which is movable with respect to a second engagement element designed in the form of a recess, and one of these engagement elements is arranged on the third carrier part, wherein, the recess and the projection are designed in such a way that during a feed movement the projection engages in the recess, wherein the first and second engagement elements are in contact by way of a first contact face at least for a time during a shaping procedure, wherein the base part is supported by the contact in a longitudinal direction of the plastics material pre-forms, wherein the first and second engagement elements are arranged in such a way that they do not come into contact with each other along the contact face at least for a time during a closing movement of the blow mould device, and wherein the projection is at least partially smaller than the first and second engagement elements to avoid at least for a time contact during the closing movement in a horizontal direction of the first and second blow mould parts.

2. An apparatus according to claim 1, wherein the base part is arranged closer to the lateral parts at least for a time during a closing movement of the blow mould device than during the shaping procedure.

3. An apparatus according to claim 1, wherein the apparatus has a drive device in order to move one of the first and second engagement elements with respect to the other of the first and second engagement elements in the longitudinal direction of the plastics material pre-forms.

4. An apparatus according to claim 3, wherein the drive device has a guide cam which is stationary.

5. An apparatus according to claim 1, wherein in a closed state of the blow mould device the contact face between the engagement elements extends in a substantially horizontal direction.

6. An apparatus according to claim 1, wherein an engagement area of the engagement elements extends along a peripheral angle—which is less than 150°—with respect to a longitudinal direction of the plastics material pre-forms.

7. An apparatus according to claim 1, wherein a mould gap, which extends transversely to the longitudinal direction of the plastics material pre-forms, is present between at least one lateral part and the base part during the shaping procedure.

8. An apparatus according to claim 7, wherein the mould gap has a width which is greater than 0.1 mm and preferably greater than 0.2 mm.

9. A method of shaping plastics material pre-forms into plastics material containers, wherein the plastics material pre-forms are introduced into a blow mould device and in the blow mould device the plastics material pre-forms are shaped into the plastics material containers by being acted upon with a flowable medium, wherein the blow mould device has at least one first blow mould part, one second blow mould part and a base part, which jointly form a cavity inside which the plastics material pre-forms are formed into the plastics material containers, wherein the blow mould parts arranged on the carrier parts are advanced one after the other for a closing procedure of the blow mould device, wherein, the base part is centered with respect to the blow mould parts, wherein for this closing procedure a first engagement element designed in the form of a projection is moved with respect to a second engagement element designed in the form of a recess and one of these engagement elements is arranged on a third carrier part which is used for holding the base part, wherein, the recess and the projection are designed in such a way that the projection engages in the recess during a feed movement, wherein the engagement elements are in contact by way of a first contact face at least for a time during a shaping procedure and the base part is supported by this contact in a longitudinal direction of the plastics material pre-forms, wherein the engagement elements are not in contact with each other along the contact face at least for a time during a closing movement of the blow mould device, and wherein the projection is at least partially smaller than the first and second engagement elements to avoid at least for a time contact during the closing movement in a horizontal direction of the first and second blow mould parts.

10. A method according to claim 9, wherein a distance between the base part and the blow mould parts is increased at least for a time after the start of the closing procedure of the blow mould device and before the start of an opening procedure of the blow mould device.

11. A method according to claim 9, wherein the engagement elements are moved with respect to each other in a longitudinal direction of the plastics material pre-forms to be expanded after the start of a closing procedure of the blow mould device and before the start of an opening procedure of the blow mould device.

12. An apparatus for shaping plastics material pre-forms into plastics material containers, comprising:
a blow mould device which forms a cavity inside, the plastics material pre-forms capable of being expanded to form the plastics material containers, wherein the blow mould device has a first blow mould part, a second blow mould part, and a base part, which are movable relative to one another in order to open or to close the blow mould device;
a blow mould carrier device for holding the blow mould device, wherein the blow mould carrier device has a first carrier part for holding the first blow mould part and a second carrier part for holding the second blow mould part, wherein the apparatus has a third carrier part for holding the base part, and wherein the apparatus has a centering mechanism in order to center the base part at least for a time with respect to the first and second blow mould parts, wherein the centering mechanism has a first engagement element which is designed in the form of a projection and which is movable with respect to a second engagement element designed in the form of a recess, and one of these engagement elements is arranged on the third carrier part, wherein, the recess and the projection are designed in such a way that during a feed movement the projection engages in the recess, wherein the first and second engagement elements are in contact by way of a first contact face at least for a time during a shaping procedure, wherein the base part is supported by the contact in a longitudinal direction of the plastics material pre-forms, wherein the first and second engagement elements are arranged in such a way that they do not come into contact with each other along the contact face at least for a time during a closing movement of the blow mould device, wherein the base part is arranged closer to the lateral parts at least for a time during a closing movement of the blow mould device than during the shaping procedure.

13. An apparatus for shaping plastics material pre-forms into plastics material containers, comprising:
a blow mould device which forms a cavity inside, the plastics material pre-forms capable of being expanded to form the plastics material containers, wherein the blow mould device has a first blow mould part, a second blow mould part, and a base part, which are movable relative to one another in order to open or to close the blow mould device;

a blow mould carrier device for holding the blow mould device, wherein the blow mould carrier device has a first carrier part for holding the first blow mould part and a second carrier part for holding the second blow mould part, wherein the apparatus has a third carrier part for holding the base part, and wherein the apparatus has a centering mechanism in order to center the base part at least for a time with respect to the first and second blow mould parts, wherein the centering mechanism has a first engagement element which is designed in the form of a projection and which is movable with respect to a second engagement element designed in the form of a recess, and one of these engagement elements is arranged on the third carrier part, wherein, the recess and the projection are designed in such a way that during a feed movement the projection engages in the recess, wherein the first and second engagement elements are in contact by way of a first contact face at least for a time during a shaping procedure, wherein the base part is supported by the contact in a longitudinal direction of the plastics material pre-forms, wherein the first and second engagement elements are arranged in such a way that they do not come into contact with each other along the contact face at least for a time during a closing movement of the blow mould device, wherein a mould gap, which extends transversely to the longitudinal direction of the plastics material pre-forms, is present between at least one lateral part and the base part during the shaping procedure.

* * * * *